Jan. 25, 1955 R. H. GREENWOOD 2,700,244
FISHHOOK GUARD
Filed Sept. 4, 1951
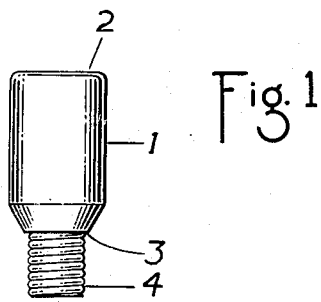
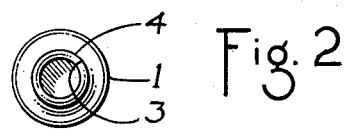
RAYMOND H. GREENWOOD
INVENTOR.
BY *G. Lorenz Miller*
ATTORNEY 000# United States Patent Office 2,700,244
Patented Jan. 25, 1955

2,700,244

FISHHOOK GUARD

Raymond H. Greenwood, Shelbyville, Ill.

Application September 4, 1951, Serial No. 244,983

1 Claim. (Cl. 43—57.5)

This invention relates to improvements in fish hook guards.

One of the objects of the invention is the provision of a novel guard to be applied to a fish hook so as to cover the pointed and barbed end thereof and prevent the fish hook from being caught in any object when the hook is contained within the fish hook guard. Of course the guard is only used when the hook is not being used in fishing.

Another object of the invention is to provide a novel fish hook guard which is simple, efficient, durable, easy to manufacture and easy to attach to, or remove from, a fish hook.

My fish hook guard can be placed on a fish hook to cover the point of the fish hook whether the hook be attached to a fish line or is contained in a fish tackle box.

In the accompanying drawings, which illustrate the preferred embodiment of this invention, Figure 1 is an elevation of my improved fish hook guard.

Figure 2 is a top plan thereof.

Figure 3 is a vertical section taken centrally through Figure 1, but showing the fish hook in elevation.

Figure 4 is a bottom plan view thereof.

The fish hook guard comprises an outer base or body portion 1 made of metal, wood, or plastic. This base or body portion 1 is in the form of an open cylinder, one end of which is enclosed by the bottom 2, and the same has a round cavity 3 therein to receive the coil wire member 4. The outer wall of the base or body member 1 practically merges at the top thereof with the open mouth of the round cavity with the base member. The coil wire member 4 is of such diameter that the same snugly fits into the cavity 3 of the base member 2. The coil wire member 4 preferably extends above the top of the body portion 1 a distance so that the pointed barb 5 of the hook H will be at about the top of the body portion 1 when the hook is engaged in the coil wire 4. The inside diameter of the coil wire member 4 is such that the bow 6 and the point 7 of the hook engage one side of the inner wall of the coil wire member 4 while the barb 5 of the hook engages the opposite side of the inner wall of the coil wire member, thus holding the hook securely in position in the hook guard.

Now, to insert the hook in the hook guard, the pointed portion of the hook is placed in the open end of the coil wire member 4 and turned into said coil wire member much as a screw, for example, is turned into receiving material. It is obvious that in this manner the point 7 and the barb 8 of the hook become engaged between the adjacent convolutions of the coil wire member 4 as shown in the Figure 3.

In my improved fish hook guard the fish hook is turned into the guard by a clockwise movement, while to remove the hook from the guard the hook is simply moved counter-clockwise. Thus the point and the barb of the hook follow the course of the coils of the coil wire member for insertion and removal in connection with the hook guard, and inasmuch as the hook cannot be inserted or removed in any other manner without damaging the hook, it is evident that my improved fish hook guard is a definite safety factor enabling fish hooks to be carried even in the pocket of the person using it without danger of injury from the point or barb of the hook.

While in the drawings I have shown a hook of the type used to be directly attached to a fishing line by the ring in the end of the hook, it is understood that snelled hooks can be equally as well held in the guard of my invention.

My invention as shown and described contemplates a new and useful article, easy to manufacture and assemble, and efficient in protecting the pointed end of a fish hook from becoming caught in objects when the hook is not being used for fishing.

What I claim is:

A guard for use with a fishhook having a curved bow terminating in a downwardly and outwardly directed point, and a barb projecting inwardly from said bow in a direction opposite to that of said point, said guard comprising an outer base member having a cavity therein, a closely wound helical coil member seated in said cavity and projecting therefrom, the convolutions of said coil forming an interior spiral surface defining a socket, the portions of said spiral surface between adjacent convolutions being engageable with the point and barb of said hook, whereby upon engagement of said surface with said point and barb, said coil may be threaded onto said hook to a position where said bow engages said surface within the socket to frictionally maintain the guard in covering relation with the hook.

References Cited in the file of this patent

UNITED STATES PATENTS

| 239,810 | Levi | Apr. 5, 1881 |
| 909,722 | West | Jan. 12, 1909 |
| 2,575,852 | Trowbridge | June 8, 1946 |
| 2,592,727 | Pamer | Apr. 15, 1952 |

FOREIGN PATENTS

| 129,448 | Sweden | Sept. 12, 1950 |